R. W. RIDGWAY.
CARCASS DEHAIRING MACHINE.
APPLICATION FILED APR. 4, 1918.
1,322,821.
Patented Nov. 25, 1919.
5 SHEETS—SHEET 1.
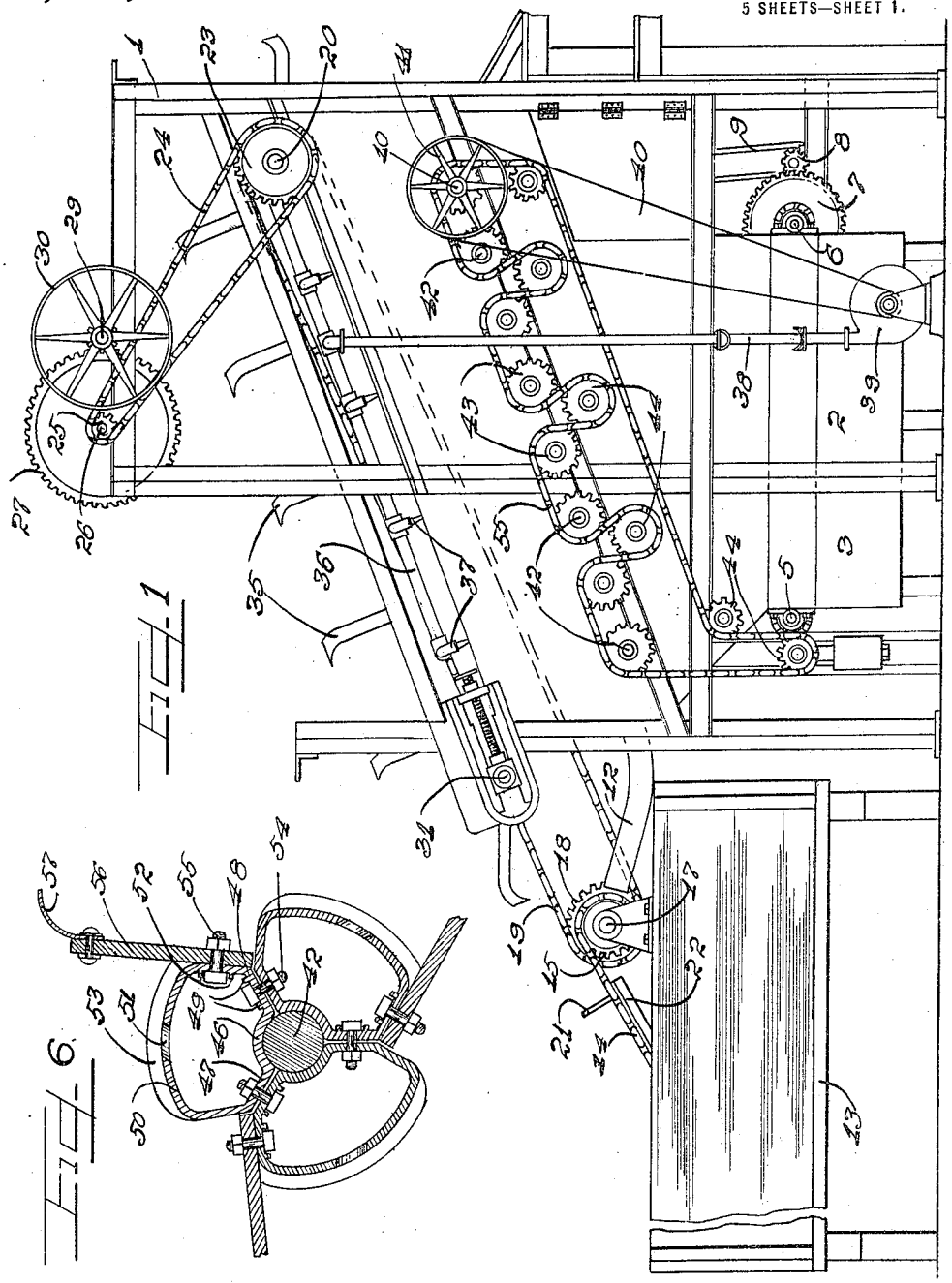

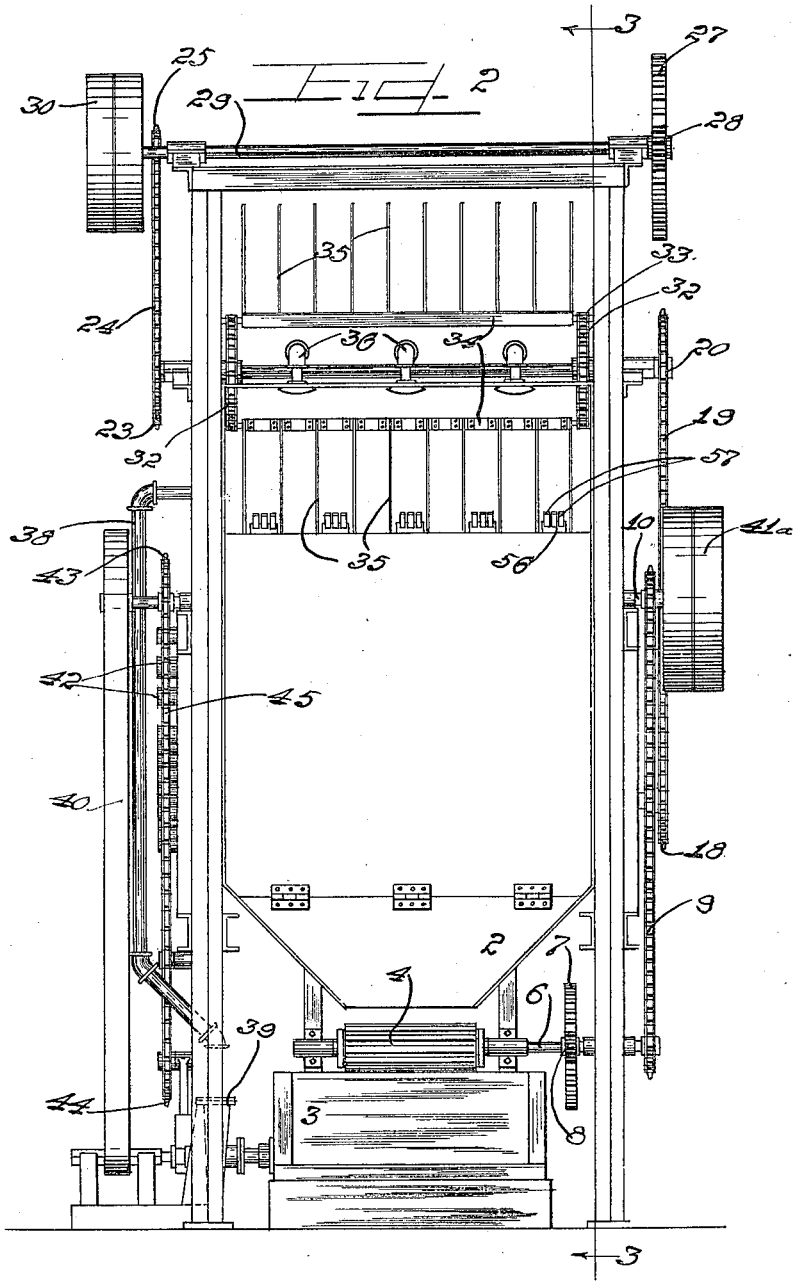

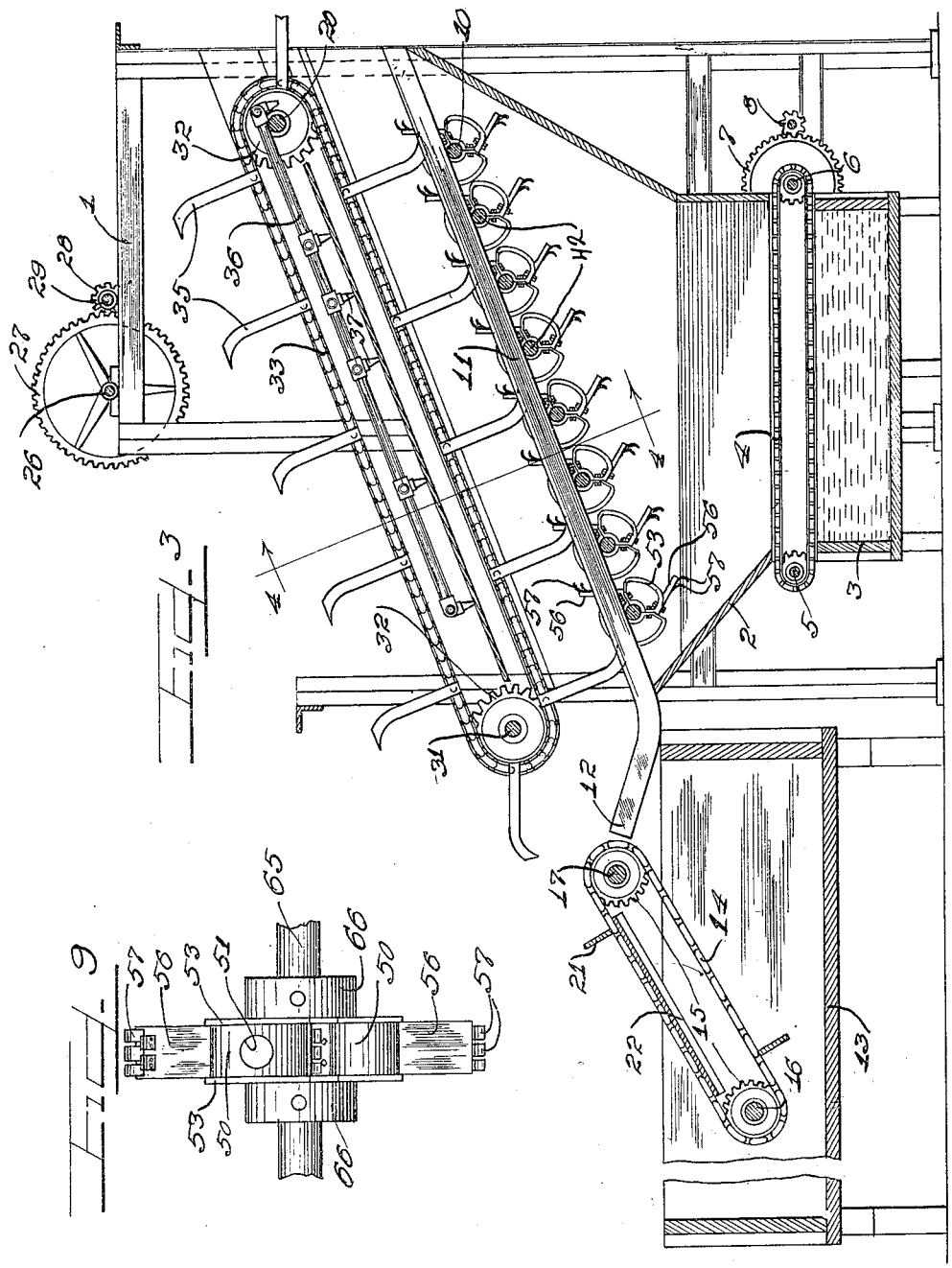

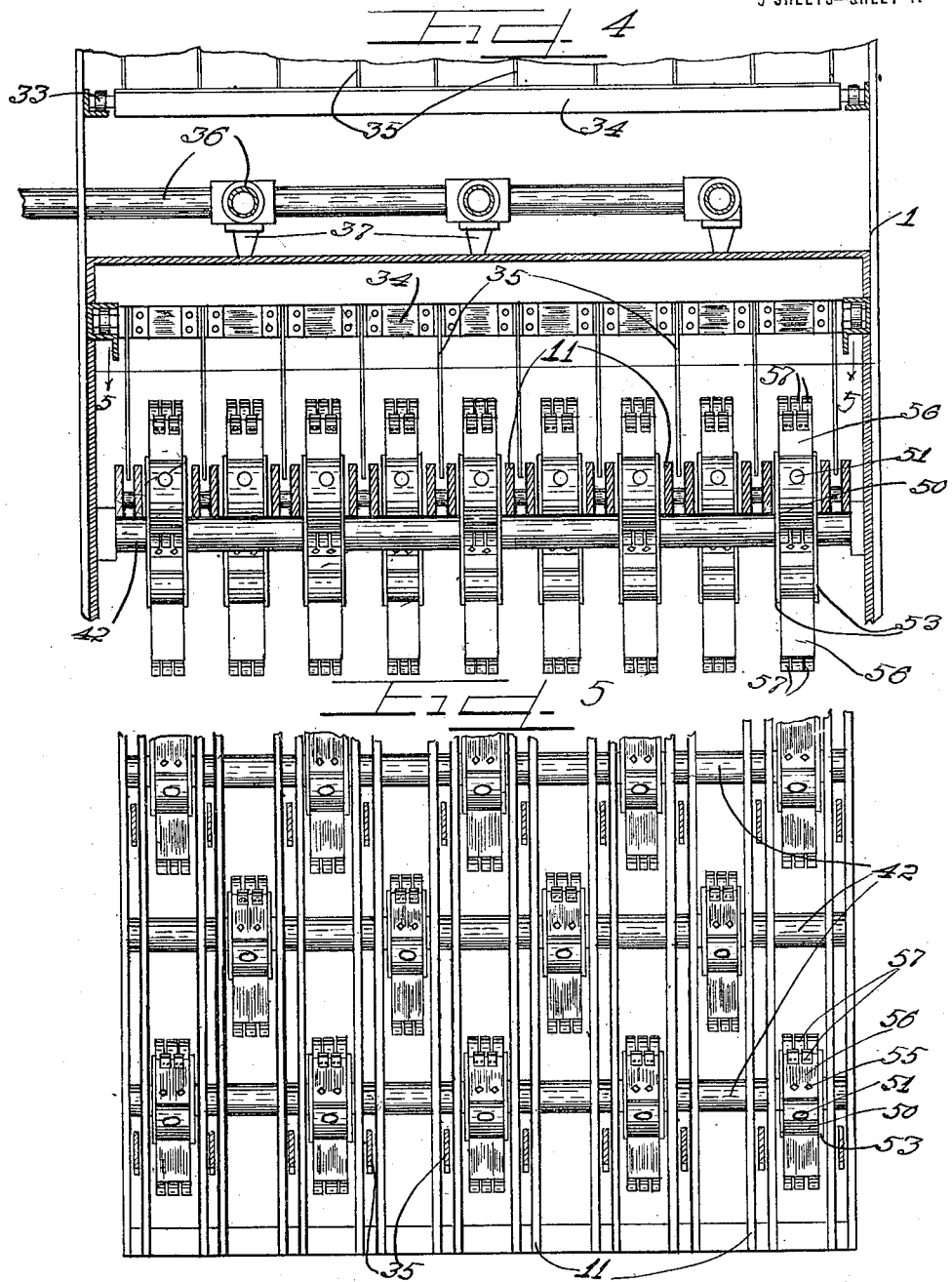

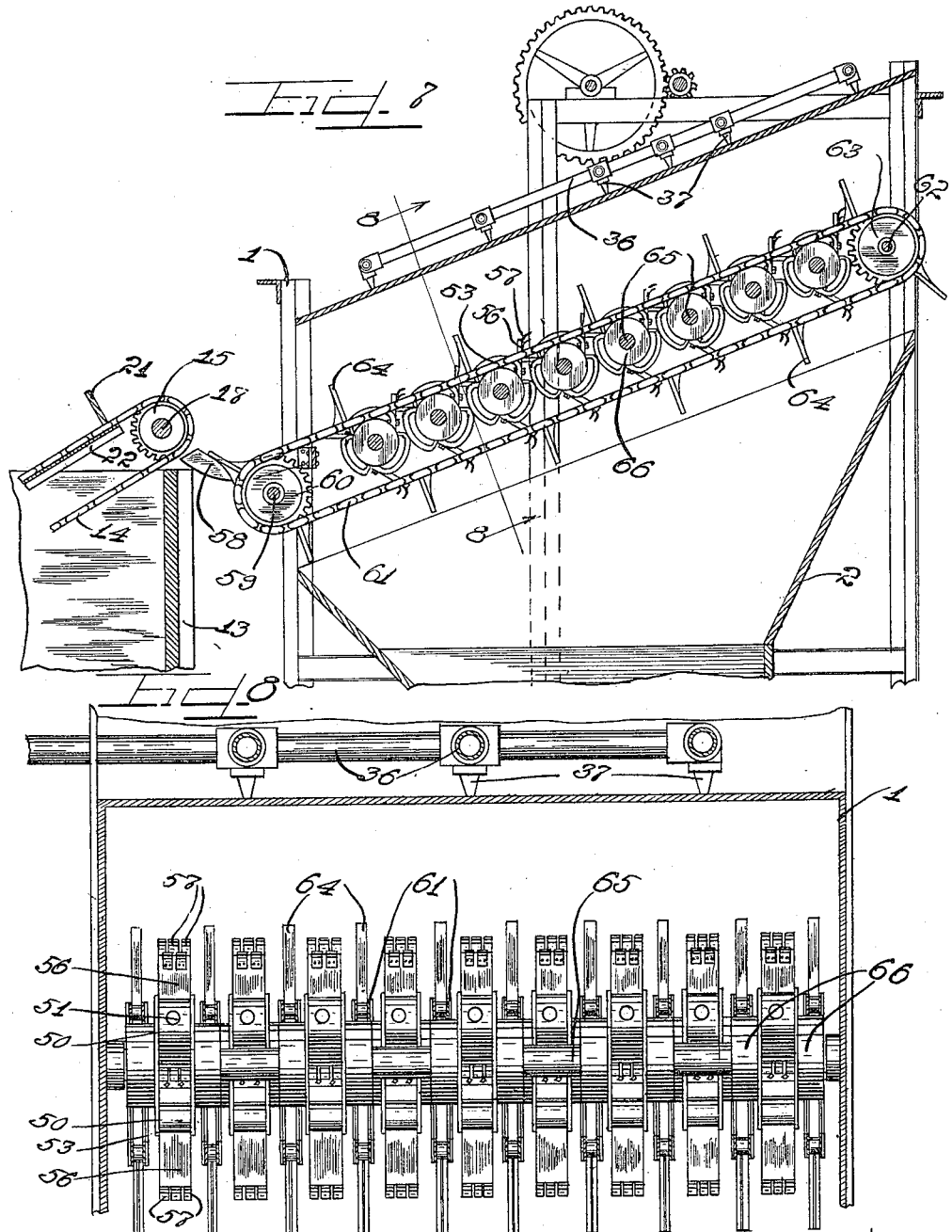

UNITED STATES PATENT OFFICE.

ROBERT W. RIDGWAY, OF CHICAGO, ILLINOIS, ASSIGNOR TO THE ALLBRIGHT-NELL COMPANY, A CORPORATION OF ILLINOIS.

CARCASS-DEHAIRING MACHINE.

1,322,821.  Specification of Letters Patent.  Patented Nov. 25, 1919.

Application filed April 4, 1918. Serial No. 226,566.

*To all whom it may concern:*

Be it known that I, ROBERT W. RIDGWAY, a citizen of the United States, and a resident of the city of Chicago, in the county of Cook and State of Illinois, have invented certain new and useful Improvements in Carcass-Dehairing Machines; and I do hereby declare that the following is a full, clear, and exact description of the same, reference being had to the accompanying drawings, and to the numerals of reference marked thereon, which form a part of this specification.

This invention relates to an improved form of hog scraping machine wherein a plurality of rows of staggered beaters are associated with a hog supporting platform for the purpose of alternately raising and lowering a hog on the platform and simultaneously rotating and conveying the same upwardly on said platform during a dehairing operation.

It is an object of this invention to provide a hog dehairing mechanism having a plurality of beaters arranged in staggered relation with respect to one another.

Another object of the invention is the construction of a hog scraping machine provided with a plurality of rows of beaters so disposed that the beaters in one row are staggered with respect to the beaters in adjacent rows to permit the beaters to be more closely associated with one another.

It is a further object of this invention to construct a carcass dehairing machine provided with staggered beaters adapted to raise and rotate carcasses on a platform during the process of dehairing the carcasses.

It is furthermore an object of the invention to construct a carcass dehairing machine wherein a plurality of parallel rows of beaters are adapted to be positioned closer together by alternately staggering the beaters in adjacent rows.

An important object of the invention is the construction of an improved form of carcass dehairing machine, embracing a plurality of rows of staggered beaters associated with an endless conveyer which is adapted to carry a carcass upwardly to be operated on by said beaters which alternately raise said carcass and permit lowering of the same during a dehairing operation.

Other and further important objects of this invention will be apparent from the disclosures in the specification and drawings.

The invention (in a preferred form) is illustrated in the drawings and hereinafter more fully described.

On the drawings:

Figure 1 is a side elevational view of a hog scraping machine embodying the principles of this invention.

Fig. 2 is a rear end view thereof.

Fig. 3 is a sectional view taken on line 3—3 of Fig. 2.

Fig. 4 is an enlarged fragmentary detail section taken on line 4—4 of Fig. 3.

Fig. 5 is a section taken on line 5—5 of Fig. 4,

Fig. 6 is a central section taken through one of the beaters, with parts broken away.

Fig. 7 is a view similar to that shown in Fig. 3, of a modified form of hog scraping machine, with parts broken away.

Fig. 8 is an enlarged fragmentary section taken on line 8—8, of Fig. 7.

Fig. 9 is a front elevation of a beater constructed similar to the beater shown in Fig. 6, but disclosing the modified form of mounting shaft therefor used in Figs. 7 and 8.

As shown on the drawings:

The reference numeral 1, indicates a supporting framework having mounted in the lower portion thereof a mechanism for conveying hair and refuse from the hog scraping machine and comprising a hopper 2, terminating in a vat or casing 3, at the lower end thereof. A conveyer or belt 4, is disposed within the vat 3, on shafts 5 and 6, and is adapted to be operated by a large gear 7, mounted on the shaft 6, and meshing with a pinion 8, which is rotated by a chain 9, trained around the gear on one extending end of a drive shaft 10, transversely journaled near the upper rear end of the framework 1.

Rigidly mounted in the framework 1, above the hopper 2, is an inclined carcass platform, grid or support, comprising a plurality of parallel inclined channel bars or beams 11, spaced from one another to afford slots or openings therebetween. The lower end of each of said bars 11, extends beyond the front end of the framework 1, and is bent upwardly as denoted by the reference numeral 12, and as clearly shown in Figs. 1 and 3, is positioned above a scalding vat 13, disposed in front of the framework 1. An inclined feed conveyer 14, is mounted within the scalding vat 13, on gears 15, mounted on a lower shaft 16, journaled in the sides of the vat 13, and on an upper shaft 17, mounted above the vat 13, and driven through a gear 18, by means of a chain 19, trained around the gear 18, and around a gear secured upon a driving shaft or axle 20, journaled transversely near the upper rear end of the framework 1, above the drive shaft 10. The vat feed conveyer 14, is provided with a plurality of flights, pushers or fingers 21, disposed at right angles to the conveyer for the purpose of engaging a carcass in the scalding vat and carrying the same upward over an inclined platform 22, disposed between the chains of the vat conveyer 14, to permit the delivery of the carcass onto the upwardly bent portions 12, of the channel bars 11. The shaft 20, has secured on one extending end thereof a gear 23, around which a chain 24, is trained. Said chain 24, is also trained around a pinion 25, keyed to one end of a shaft 26, journaled upon the top of the framework 1. A large driving gear 27, is secured on the other end of the shaft 26, and meshes with a small gear 28, mounted on one end of a main shaft 29, also journaled upon the top of the framework 1, and having a pulley wheel 30, secured on the other end thereof adapted to be driven from any suitable source of power.

Adjustably journaled across the front of the framework 1, below the shaft 20, is a shaft 31. Each of the shafts 20 and 31, is provided with sprocket wheels 32, around which an inclined conveyer 33, is trained, equipped with cross-pieces 34, to each of which a plurality of equidistantly spaced pushers or arms 35, are secured. The outer ends of said pushers 35, are slightly curved, and when directed downwardly slidably, engage in the grooves afforded by the channel bars 11, for the purpose of delivering or moving a carcass from the bent portion 12, of the platform, upwardly on the platform.

A spray mechanism is rigidly supported on the framework 1, within the endless conveyer 33, and comprises a plurality of interconnected pipes 36, equipped with a plurality of distributed spray nozzles 37, for spraying and washing carcasses as they are conveyed through the machine upwardly on the supporting platform by the conveyer 33. The pipes 36, are connected with the upper end of a main feed pipe 38, the lower end of which is connected with a centrifugal pump 39, mounted on one side of the machine, and is driven by the beater driving shaft 10, through a belt 40, and a pulley wheel 41, which is secured upon one extending end of the shaft 10. Secured upon the other extending end of the shaft 10, is a main driving pulley 41$^a$, which is driven from any suitable source of power.

Rotatably journaled transversely on the framework 1, below the inclined platform, are a plurality of parallel beater shafts 42, disposed in an inclined plane parallel to the plane of the platform. Said beater driving shaft 10, is also disposed in the plane of the beater shafts 42, and is parallel with said shafts 42. Securely and removably clamped upon each of said beater shafts 10 and 42, are a plurality of spaced beaters or scrapers, alternately disposed in the slots or openings afforded by the channel bars 11, of the supporting platform. In order that the beater shafts may be mounted closer to one another the beaters on adjacent beater shafts are staggered with respect to each other, as clearly shown in Fig. 5, thereby affording an arrangement of beaters adapted to continuously engage a carcass as the same is carried upwardly on the supporting platform by the pushers 35, of the conveyer 33. Secured on one projecting end of each of the beater shafts 10 and 42, is a sprocket wheel 43. Trained around pairs of the beater sprocket wheels 43, and around a plurality of idler sprocket wheels 44, rotatably journaled on the framework 1, below the sprocket wheels 43, and in the same vertical plane therewith, is an endless driving chain 45, adapted to be driven by the driving beater shaft 10, for the purpose of simultaneously rotating all of the beaters at the same rate of speed.

As clearly shown in Fig. 6 each of the beaters embraces a plurality of similarly constructed metal clamping members, each of which comprises an inner arc-shaped clamping wall 46, adapted to seat upon a beater shaft 42. Integrally formed on opposite sides of said curved wall 46, are inclined abutment walls 47 and 48, each provided with an aperture. Formed integrally on the inner surface of the inclined wall 48, and on opposite sides of the aperture, is a pair of parallel ribs or abutments 49. The outer ends of the inclined walls 47 and 48, are integrally connected one to the other by means of an arched supporting member or loop 50, provided with an opening 51, in the outer portion thereof substantially opposite the curved wall 46. The loop 50, is provided with apertures in the side wall thereof adjoining the inclined wall 48, and integrally formed on the inner surface of said side wall on opposite sides of each of said apertures are ribs or abutments 52. Integrally formed on opposite sides of the loop 50, are a pair of outwardly directed parallel flanges or guides 53, each of which starts on the side of said loop adjacent the inclined wall 48, and continues upwardly around the outer curved wall of the loop, and terminates at the upper end of the loop wall connected with the inclined wall 47. The flanges 53, thus afford a guide channel. The clamping members are removably secured to one another around a beater shaft by means of clamping or retaining bolts 54, which project through the registering apertures in the abutting inclined walls 47 and 48, of adjacently disposed clamping members. The bolts 54, are positioned with the heads thereof placed between the ribs 49, to prevent rotation of said bolts as the nuts thereof are threaded into position thereon. The openings 51, in the looped walls of the clamping members afford a means whereby the retaining bolts may be secured in position or removed. Removably secured by retaining bolts 55, to each of the clamping members between the guide flanges 53, and on the side provided with apertures, is the lower end of an outwardly extending flexible beater arm 56, made out of fabric or other suitable material. Rigidly secured on the leading face and near the outer end of each of said beater arms are a plurality of curved beater or scraping blades 57, made of metal or other desirable material.

In the modified form of hog scraping machine shown in Figs. 7 to 9, inclusive, the construction is substantially the same as that already described with the exception that the stationary carcass supporting platform formed by the channel bars 11, is replaced by a number of equidistantly spaced curved bracket arms 58, the inner ends of which are rigidly secured to the front of the framework 1, while the outer ends are positioned adjacent the upper end of the scalding vat conveyer 14, to permit carcasses from said scalding vat to be deposited on said bracket arms. Rotatably journaled transversely on the front wall of the framework 1, below the bracket arms 58, is a shaft 59, provided with a plurality of sprocket wheels 60, disposed between the bracket arms 58, and around each of which an endless chain 61, is trained. A driving shaft 62, is journaled transversely near the upper rear end of the framework 1, and secured on said driving shaft 62, are a plurality of sprocket wheels 63, disposed in the planes of the sprocket wheels 60, to permit the upper ends of the chains 61, to be trained around said sprocket wheels 63, to afford an inclined continuous movable supporting frame, the chain belts of which are simultaneously actuatable, and are each provided with a plurality of outwardly projecting pushers or arms 64, adapted to lift a carcass off of the bracket arms 58, to permit the movable support to carry the carcass upwardly through the machine. A plurality of parallel beater shafts 65, are transversely journaled in the framework 1, in an inclined plane between the upper and lower laps of the chains 61, of the movable support. Said beater shafts 65, have secured thereon a plurality of hubs or drums 66, disposed in the planes of the chains 61, and affording supports for the upper laps of said chains, intermediate the shafts 59 and 62. Secured on each of the beater shafts 65, between alternate pairs of the drums 66, are a plurality of beaters similar in construction to the beaters already described and shown in detail in Fig. 6. To permit adjacent beater shafts 65, to be mounted in close proximity to each other, the beaters on adjacent beater shafts are staggered with respect to each other.

The operation is as follows:

When the hog scraping machine is set in operation by rotating the pulley wheels 30 and 41$^a$, from any suitable source of power, the conveyers and beaters are also operated. A hog carcass in the scalding vat 13, is engaged by the arms 21, and is carried upwardly over the platform 22, and is deposited upon the apron formed by the upwardly curved ends 12, of the channel bars 11. The pushers 35, next engage the carcass and push the same upwardly on the stationary platform into the field of operation of the staggered beaters.

As shown in Fig. 3, the beaters are so mounted and formed that in certain positions the flanged outer curved portions thereof project upwardly beyond the upper surface of the carcass platform, while in other positions the uppermost portions of the beaters are substantially flush with the upper surface of the carcass platform. This arrangement permits the carcass in the field of operation of the beaters to be alternately raised and lowered upon said platform, and at the same time said carcass is given a rotary motion by the flexible beater arms 56, of the rotating beaters, the blades 57, of which, strike the carcass and dehair or scrape the same. The spraying apparatus is used during the dehairing process, and the removed hair and refuse is washed into the hopper 2, and is carried off by the conveyer belt 4, while the water from the spraying apparatus runs into the lower portion of said hopper from which it is drained.

The flexible beater arms 56, are movably secured to the metal clamping members of the beaters, and are disposed between the flanges 53, in such a manner that when said beater arms are bent rearwardly in striking against a carcass, said flanges 53, act as guides for said beater arms and prevent the same from moving or bending laterally, thus obviating said beater arms from accidentally striking the pushers 35, of the conveyer 33.

As clearly shown in Figs. 4 and 5, the beater shafts are permitted to be mounted within a short distance of one another due to the staggered arrangement of the beaters upon adjacent beater shafts. This staggered arrangement of the beaters also has the advantage of continuously subjecting a carcass to the action of the beater arms and blades from the time it is moved into the field of operation of the lowermost beaters until it is discharged from the upper end of the carcass platform.

In the modified form of machine shown in Figs. 7 to 9, inclusive, a carcass from the scalding vat is delivered onto the apron 58, by the conveyer 14, from which position the carcass is engaged by the pushers 64, and is carried upwardly by the movable platform formed by the chains 61. When the carcass is moved into the field of operation of the rapidly rotating staggered beaters, said carcass is alternately raised and lowered, and is simultaneously rotated by the combined action of the beater arms and the moving platform. As previously described, during the dehairing of a carcass, the same is washed by sprays of liquid from the nozzles 37, which are disposed above the movable carcass platform.

I am aware that numerous details of construction may be varied through a wide range without departing from the principles of this invention, and I therefore do not purpose limiting the patent granted otherwise than necessitated by the prior art.

I claim as my invention:

1. In a hog scraping machine embracing a stationary support, and staggered beaters acting through said support on carcasses supported thereon to alternately raise and lower said carcasses and simultaneously rotate the same during a dehairing operation.

2. A carcass scraping machine comprising an inclined stationary support having openings therein, and a plurality of rows of beaters associated therewith acting through said openings on carcasses carried on said support, said rows of beaters arranged with the beaters of adjacent rows staggered with respect to one another.

3. In a device of the class described, a platform having openings therein, means independent of the platform and mounted thereabove for advancing carcasses thereover, and a plurality of rotatable staggered beaters acting through said openings to rotate said carcasses and alternately raise and lower the same during a dehairing operation.

4. In a device of the class described, a platform having openings therein, means thereabove and independent of the platform for advancing carcasses thereover shafts rotatably associated with said platform, and beaters on said shafts acting through said platform openings to engage said carcasses to rotate and dehair the same, said beaters arranged with the beaters on adjacent shafts staggered with respect to each other.

5. The combination with a carcass dehairing machine, of shafts journaled therein, means secured thereon to rotate therewith arranged with the means on adjacent shafts staggered with respect to one another to permit said shafts to be mounted in close relation with respect to each other, beater members on said means adapted to engage carcasses to rotate and dehair the same, and an endless conveyer disposed in an inclined plane above said beater members for carrying carcasses into the field of operation of said beater members.

6. In a machine of the class described, a slotted support, staggered rotary scraping mechanisms acting upwardly through the slotted support on carcasses supported thereon, means independent of the support for advancing said carcasses through the machine, means beneath said mechanisms for conveying hair and refuse from the machine, and means above said mechanisms for spraying a liquid upon said carcasses to wash the same during a dehairing operation.

7. In a carcass dehairing machine of the class described, a plurality of parallel shafts rotatably journaled in said machine in an inclined plane, beaters secured on said shafts with the beaters on adjacent shafts staggered with respect to one another, and continuously rotating inclined means above the plane of said beater shafts for advancing carcasses into the field of operation of said beaters to permit dehairing of said carcasses by said beaters.

In testimony whereof I have hereunto subscribed my name in the presence of two subscribing witnesses.

ROBERT W. RIDGWAY.

Witnesses:
 EARL M. HARDINE,
 CHARLES W. HILLS, Jr.